United States Patent
Zhang et al.

(10) Patent No.: US 12,422,800 B2
(45) Date of Patent: Sep. 23, 2025

(54) HIERARCHICAL ENERGY MANAGEMENT FOR COMMUNITY MICROGRIDS WITH INTEGRATION OF SECOND-LIFE BATTERY ENERGY STORAGE SYSTEMS AND PHOTOVOLTAIC SOLAR ENERGY

(71) Applicant: CHANGSHA UNIVERSITY OF SCIENCE AND TECHNOLOGY, Changsha (CN)

(72) Inventors: Yongxi Zhang, Changsha (CN); Youjun Deng, Changsha (CN); Yuanyuan Wang, Changsha (CN); Gongping Wu, Changsha (CN)

(73) Assignee: CHANGSHA UNIVERSITY OF SCIENCE AND TECHNOLOGY, Changsha (CN)

( * ) Notice: Subject to any disclaimer, the term of this patent is extended or adjusted under 35 U.S.C. 154(b) by 443 days.

(21) Appl. No.: 18/056,170

(22) Filed: Nov. 16, 2022

(65) Prior Publication Data
US 2023/0070151 A1 Mar. 9, 2023

Related U.S. Application Data

(63) Continuation of application No. PCT/CN2021/144073, filed on Dec. 31, 2021.

(30) Foreign Application Priority Data

Mar. 19, 2021 (CN) .......................... 202110297160.7

(51) Int. Cl.
G05B 13/04 (2006.01)
H02J 3/00 (2006.01)
H02J 3/38 (2006.01)

(52) U.S. Cl.
CPC ............ *G05B 13/048* (2013.01); *H02J 3/003* (2020.01); *H02J 3/004* (2020.01); *H02J 3/381* (2013.01);
(Continued)

(58) Field of Classification Search
CPC . H02J 3/003; H02J 3/004; H02J 3/381; G05B 13/048
(Continued)

(56) References Cited

U.S. PATENT DOCUMENTS

| | | | |
|---|---|---|---|
| 2013/0166233 A1* | 6/2013 | Suh ...................... | G01R 31/382 702/63 |
| 2014/0350743 A1* | 11/2014 | Asghari ............... | G05B 13/048 700/297 |

(Continued)

FOREIGN PATENT DOCUMENTS

| | | |
|---|---|---|
| CN | 109066948 A | 12/2018 |
| CN | 110750874 A | 2/2020 |

(Continued)

OTHER PUBLICATIONS

Youjun Deng et al., Operational Planning of Centralized Charging Stations Utilizing Second-Life Battery Energy Storage Systems, IEEE Transactions on Sustainable Energy, pp. 1-13, Year-2020.

(Continued)

*Primary Examiner* — Jigneshkumar C Patel

(57) ABSTRACT

A second-life battery-based super multi-objective energy management method for a smart community microgrid, including: establishing a residual life decay model of the second-life battery based on a residual charge and discharge cycle number; establishing a super multi-objective energy management model based on residential energy consumption costs, the residual life decay model of the second-life battery, residential electricity consumption behaviors, and (Continued)

impacts of residential community load on an electricity distribution system; recording state information of the second-life battery in the smart community; collecting residential electricity consumption information in the smart community, and predicting a renewable energy output value of the smart community; and solving the super multi-objective energy management model by using a NSGA-III algorithm combining with the state information of the second-life battery and the renewable energy output value.

8 Claims, 3 Drawing Sheets

(52) U.S. Cl.
CPC ....... *H02J 2203/20* (2020.01); *H02J 2300/24* (2020.01)

(58) Field of Classification Search
USPC ......................................................... 700/287
See application file for complete search history.

(56) References Cited

U.S. PATENT DOCUMENTS

| | | | |
|---|---|---|---|
| 2016/0064934 A1* | 3/2016 | Zhao | H02J 3/38 700/287 |
| 2018/0254632 A1 | 9/2018 | Elbsat et al. | |
| 2019/0033388 A1 | 1/2019 | Karner et al. | |

FOREIGN PATENT DOCUMENTS

| | | |
|---|---|---|
| CN | 111507626 A | 8/2020 |
| CN | 111740442 A | 10/2020 |
| CN | 112952820 A | 6/2021 |
| JP | 2005151730 A | 6/2005 |

OTHER PUBLICATIONS

Chuanshi Cui et al., Capacity configuration of retired battery energy storage system for smoothing wind power fluctuations, Chinese Journal of Power Sources, 2020.8, vol. 44, No. 8, pp. 1185-1190.

* cited by examiner

HIERARCHICAL ENERGY MANAGEMENT FOR COMMUNITY MICROGRIDS WITH INTEGRATION OF SECOND-LIFE BATTERY ENERGY STORAGE SYSTEMS AND PHOTOVOLTAIC SOLAR ENERGY

CROSS-REFERENCE TO RELATED APPLICATIONS

This application is a continuation of International Patent Application No. PCT/CN2021/144073, filed on Dec. 31, 2021, which claims the benefit of priority from Chinese Patent Application No. 202110297160.7, filed on Mar. 19, 2021. The content of the aforementioned application, including any intervening amendments thereto, is incorporated herein by reference in its entirety.

TECHNICAL FIELD

This application relates to community energy management, and more particularly to a second-life battery-based multi-objective energy management method for a smart community microgrid.

BACKGROUND

In recent years, with the increasingly development of smart grids, smart communities as energy-using terminals have drawn extensive attention worldwide. Smart communities can support clean energy and energy storage batteries, encourage energy laddering and recycling, guide users to optimize energy use structure, improve energy efficiency, and achieve energy saving and emission reduction. To realize real-time monitoring and optimal operation management of multiple integrated energy sources (electric energy, thermal energy, gas energy, and electric vehicles) in smart communities and improve energy utilization efficiency, a smart community energy management system can be established by installing smart energy management controllers and smart meters in per household to reduce residential electricity consumption costs, smooth the load curve, improve the quality and safety of system power supply, and realize the friendly interaction between electricity consumption links and electricity users.

At present, the generally recognized energy management systems mainly include individual household energy management systems, building energy management systems, and community energy management systems (CEMS). The individual household energy management systems focus on optimizing and dispatching the load aiming to minimizing the cost of electricity for the user or maximizing the comfort of the user. Compared with individual households, smart communities have the advantages of large total dispatchable loads, many distributed power sources, and high potential for coordination and cooperation with the grid. On the other hand, the current price of energy storage batteries is still relatively high, hindering its widespread use. According to statistics, tens of billions of second-life batteries will enter the recycling market starting in 2020. Those second-life batteries can be used in other fields with lower requirements for battery performance, such as microgrid, backup power, and lighting. However, considering that second-life batteries have more complex life decay characteristics compared with normal battery, energy management models are necessary for optimization of the second-life batteries. Given the current early stage of research on smart community energy management models, studies that consider the coordination of cascade utilization of second-life batteries with distributed energy sources are rarely reported. In addition, the community energy management system includes coordinated interaction between the grid and residential users, which is reflected in many aspects such as cost of electricity for the user, load curve, and electricity consumption behavior of the user. It is difficult for single-objective or multi-objective models to consider the above factors comprehensively, and they have certain limitations.

Therefore, it is necessary to provide a second-life battery-based multi-objective energy management model for a smart community microgrid.

SUMMARY

To overcome the deficiencies in the prior art, this disclosure provides a second-life battery-based multi-objective energy management method for a smart community microgrid. The method provided herein has simple algorithms and low costs.

The technical solutions of the disclosure are described below.

The disclosure provides a second-life battery-based super multi-objective energy management method for a smart community microgrid, comprising:

(S1) establishing a residual life decay model of a second-life battery based on a residual available capacity, a residual charge and discharge cycle number, and a capacity retention rate of the second-life battery;

(S2) comprehensively analyzing an energy consumption behavior of each household to determine a dispatchable interval of an electric energy demand for a smart community; and establishing a super multi-objective energy management model based on residential energy consumption costs, the residual life decay model of the second-life battery, residential electricity consumption behaviors, and impacts of residential community load on an electricity distribution system;

(S3) recording state information of the second-life battery in the smart community;

(S4) collecting residential electricity consumption information in the smart community; and predicting a renewable energy output value of the smart community; and (S5) solving the super multi-objective energy management model by using an non-dominated sorting genetic algorithm-III (NSGA-III) combining with the state information of the second-life battery and the renewable energy output value at a current period to obtain charge and discharge quantities of the second-life battery at each period within a day; and plotting a total energy consumption curve of the smart community by adjusting the charge and discharge quantities of the second-life battery.

In some embodiments, step (S1) is performed through steps of:

calculating an expected annual cycle number of a power battery of an electric vehicle by the following formulas:

$$n_{battery} = \frac{365eE(D)}{100Q_{battery}}; \text{ and} \qquad (1)$$

$$E(D) = 1.61 \cdot \exp\left(\mu_D + \frac{\sigma_D^2}{2}\right); \qquad (2)$$

wherein $n_{battery}$ represents an annual cycle number of the power battery; e represents a power consumption per 100 km of the electric vehicle; E(D) represents an expected value of daily driving range of the electric vehicle; $\mu_D$ and $\sigma_D$ respectively represent a mean value and variance of the expected value E(D) of daily driving range, $\mu_D=3.2$, and $\sigma_D=0.88$; and $Q_{battery}$ represents a rated capacity of the power battery;

when the power battery is decommissioned from the electric vehicle, calculating a total cycle number $n_{retire}$ of the power battery by the following formula:

$$n_{retire}=N \cdot n_{battery} \quad (3);$$

wherein N represents an annual service life of the power battery when decommissioned;

defining a ratio of an actual capacity to a rated capacity as a capacity retention rate; since a residual available capacity of a second-life battery decreases with increases in charge and discharge cycle numbers during use, and the capacity retention rate of the second-life battery declines with the charge and discharge cycle numbers in accordance with a power function, calculating the capacity retention rate of the second-life battery by the following formula:

$$Rc(n)=Q_0(C)-\chi \cdot n^\tau \quad (4);$$

wherein Rc(n) represents a capacity retention rate of the second-life battery after n cycles; and $Q_0$ (C), $\chi$, and $\tau$ represents an initial capacity retention rate, a capacity decay coefficient, and a power index, respectively;

defining that when the capacity retention rate of the second-life battery decays to a capacity retention rate threshold $Rc^{thr}$, the second-life battery is scraped; and calculating a maximum available cycle number $n_{scrap}$ of the second-life battery by the following formula:

$$n_{scrap} = \left( \frac{Q_0(C) - Rc^{thr}}{\chi} \right)^{\tau^{-1}} ; \quad (5)$$

calculating a residual charge and discharge cycle number $n_{sec}$ of the second-life battery by subtracting the total cycle number $n_{retire}$ from the maximum available cycle number $n_{scrap}$ of the second-life battery, expressed by:

$$n_{sec}=n_{scrap}-n_{retire} \quad (6);$$

defining a cell capacity of the second-life battery as $A_{rate}$ (MAh); specifying that when the capacity retention rate of the second-life battery decays to a threshold value $Rc^{thr}$, the second-life battery is scraped; and calculating an available interval capacity $A_{SL}$ of the second-life battery by the following formula:

$$A_{SL}=A_{rate} \cdot [Rc(n^{retire})-Rc^{thr}] \quad (7); \text{ and}$$

estimating an average decay capacity $A_{fade}$ of the second-life battery after one complete charge and discharge cycle based on the residual available capacity and the residual charge and discharge cycle number of the second-life battery by the following formula:

$$A_{fade}=A_{SL}/n_{sec} \quad (8)$$

In some embodiments, in step (S2), the dispatchable interval of the electric energy demand is determined through steps of:

discretizing a continuous 24-hour day into T periods; wherein for any a $t^{th}$ period, $t \in [1, 2, \ldots, T]$; and at the beginning of a dispatching cycle, predicting a residential electricity load curve and renewable energy output information by an energy management center in the smart community through a smart measurement system;

wherein a photovoltaic (PV) output of the smart community microgrid is expressed as:

$$P_{solar}=A \cdot S \cdot \xi \cdot [1-0.005(T_{out}-25)] \quad (9);$$

wherein $P_{solar}$ represents a PV output; S represents an area of PV arrays installed in the smart community; $\xi$ represents photoelectric conversion efficiency; A represents a light intensity; and $T_{out}$ represents an outdoor temperature; and for users in the smart community, $\Theta$ represents a set of all households in the smart community; and a power consumption of a $l^{th}$ household in a period t of the past mill day is expressed by $P_{home,l}^m(t)$, $t \in [1, T]$, combined with historical load data to obtain a value range of residential electricity loads.

In some embodiments, in step (S2), the super multi-objective energy management model comprises a first objective function $f_1$, a second objective function $f_2$, a third objective function $f_3$, and a fourth objective function $f_4$;

wherein the first objective function $f_1$ is configured to minimize a total community energy consumption cost, expressed by:

$$\begin{cases} \min f_1 = \sum_{t=1}^{T} \Phi(t) \Delta t \\ \Phi(t) = \begin{cases} P_{grid}(t) \cdot \theta(t) \Delta t, & \text{for } P_{grid}(t) \geq 0 \\ P_{grid}(t) \cdot \rho(t) \Delta t, & \text{for } P_{grid}(t) < 0 \end{cases} \end{cases} ; \quad (10)$$

wherein $\Phi(t)$ represents a energy consumption cost function in a period t; $\theta(t)$ and $\rho(t)$ represent an electricity-purchasing price of the smart community microgrid form a superior grid and an electricity-selling price of the smart community microgrid to the superior grid, respectively; $P_{grid}(t)$ represents a power of interaction between the smart community microgrid and the superior grid; $P_{grid}(t) \geq 0$ represents that the smart community purchases electricity from the superior grid, and otherwise, the smart community sells electricity to the superior grid;

the second objective function $f_2$ is configured to minimize impacts on the residential electricity consumption behaviors, expressed by:

$$\min f_2 = \sum_{t=1}^{T} \sqrt{(P_{com}(t) - P_{com}^{re}(t))^2} ; \text{ and} \quad (11)$$

$$P_{com}(t) = \sum_{l \in \Theta} P_{home,l}(t); \quad (12)$$

wherein $P_{com}(t)$ represents a total electricity load of the smart community in a period t before optimization of an energy management system, which is a sum of loads of all households in the smart community; $P_{com}^{re}(t)$ represents a total electricity load of the smart community in the period t after the optimization of the energy management system; $P_{home,l}(t)$ represents a load of a $l^{th}$ household of the smart community in the period t; and $\Theta$ represents the set of all households in the smart community;

the third objective function $f_3$ is configured to minimize a life loss of the second-life battery, represented by:

$$\begin{cases} \min f_3 = A_{fade} \cdot N_{100}^{eq,day} \\ N_{100}^{eq,day} = \sum_{k \in C} 0.5 \cdot (d_k^{half})^p \end{cases} ; \quad (13)$$

wherein $A_{fade}$ represents an average decay capacity of the second-life battery experienced one complete charge and discharged cycle; $N_{100}^{eq,day}$ represents a daily charge and discharge cycle number of the second-life battery after equivalent conversion; p is a constant, and is 0.8-2.1; C represents a charge and discharge half-cycle number; $d_k^{half}$ represents a depth of discharge (DoD) of the second-life battery in a $k^{th}$ half-cycle, which is obtained through an energy curve of the second-life battery, shown in formula (14):

$$d_k^{half} = \frac{|E_k - E_{k-1}|}{E_{SL,rate}}, \forall k \in C; \quad (14)$$

wherein k represents a half-cycle number index of the second-life battery index, and is a modulus value of the charge and discharge half-cycle number C; $E_{SL,rate}$ represents a rated capacity of the second-life battery; and $E_k$ represents an energy level of the second-life battery at the end of a $k^{th}$ half-cycle, which corresponds to a local extreme point on the energy curve; and the fourth objective function $f_4$ is configured to minimize a peak-to-average ratio of a community load curve;

wherein the objective function $f_4$ consists of a sum of a positive peak-to-average ratio (PPAR) and a negative peak-to-average ratio (NPAR); the PPAR represents a load peak-to-average (PAR) when the smart community purchases electricity from the superior grid, and the NPAR represents a load PAR when the smart community sells electricity to the superior grid, expressed as:

$$\begin{cases} \min f_4 = NPAR + PPAR \\ PPAR = \dfrac{T_p \cdot \max_{t \in [1,T_p]} \{P_{grid}(t)\}}{\sum_{t \in [1,T_p]} P_{grid}(t)}, \text{ for } P_{grid}(t) > 0 \\ NPAR = \dfrac{T_N \cdot \min_{t \in [1,T_N]} \{P_{grid}(t)\}}{\sum_{t \in [1,T_N]} P_{grid}(t)}, \text{ for } P_{grid}(t) < 0 \end{cases} ; \quad (15)$$

wherein $T_N$, and $T_P$ represent an electricity-purchasing duration and an electricity-selling duration in a dispatch cycle respectively.

In some embodiments, in step (S2), the super multi-objective energy management model further comprises a system power balance constraint, a community load curve constraint, and an energy storage system operation constraint;

wherein the system power balance constraint is expressed as:

$$P_{grid}(t) = P_{com}^{re}(t) + P_{SL}(t) - P_{solar}(t) \quad (16);$$

wherein $P_{solar}(t)$ represents a PV output in a period t; $P_{SL}(t)$ represents a charging and discharging power of the second-life battery in the period t; if $P_{SL}(t)>0$, it indicates the second-life battery is charging, and otherwise, the second-life battery is discharging; and $P_{com}^{re}(t)$ represents a total electricity load of the smart community in the period t after optimization by the energy management system;

the community load curve constraint is expressed as:

$$\begin{cases} P_{com}^{min}(t) \le P_{com}^{re}(t) \le P_{com}^{max}(t), \forall t = 1, 2, \ldots, T \\ \sum_{t=1}^{T} P_{com}^{re}(t) - \sum_{t=1}^{T} P_{com}(t) = 0 \end{cases} ; \quad (17)$$

wherein $P_{com}^{min}(t)$ represents a minimum energy consumption power of the smart community microgrid in a period t; $P_{com}^{max}(t)$ represents a maximum energy consumption power of the smart community microgrid in the period t; $P_{com}^{re}(t)$ represents a total electricity load of the smart community microgrid after optimization by the energy management system in the period t; and $P_{com}(t)$ represents a total community electricity load; and the energy storage system operation constraint is expressed as:

$$\begin{cases} SOC_{SL,min} \le SOC_{SL}(t) \le SOC_{SL,max}, \forall t \in [1, T] \\ SOC_{SL}(t) = E_{SL}(t)/E_{SL,rate}, \forall t \in [1, T] \\ -P_{SL,max-} \le P_{SL}(t) \le P_{SL,max+}, \forall t \in [1, T] \\ SOC_{SL}(t) \ge SOC_{desire}, t = T \end{cases} ; \quad (18)$$

wherein $SOC_{SL}(t)$ represents a state of charge (SOC) of the second-life battery in a period t; $SOC_{SL}(t)$ and $SOC_{SL,max}$ represent a minimum SOC and maximum SOC of the second-life battery, respectively; $P_{SL,max-}$ and $P_{SL,max+}$ represent a maximum charge power and maximum discharge power of the second-life battery, respectively; $SOC_{desire}$ represents a preset SOC threshold of the second-life battery; $E_{SL}(t)$ represents a residual electric quantity of the second-life battery in period t; and $E_{SL,rate}$ represents a rated capacity of the second-life battery.

In some embodiments, the total community electricity load $P_{com}(t)$ is calculated through steps of:

estimating a minimum electricity load and maximum electricity load of each household of the smart community in the period t by using the historical electricity load data; and summing up electrical loads of all households of the smart community to obtain a range of the total community electricity load by the following formulas:

$$\begin{cases} P_{com}^{min}(t) = \sum_{l \in \Theta} P_{home,l}^{min}(t), \forall t \in [1, T] \\ P_{home,l}^{min}(t) = \min_{m \in [1,M]} P_{home,l}^{m}(t) \end{cases} ; \text{ and} \quad (19)$$

$$\begin{cases} P_{com}^{max}(t) = \sum_{l \in \Theta} P_{home,l}^{max}(t), \forall t \in [1, T] \\ P_{home,l}^{max}(t) = \max_{m \in [1,M]} P_{home,l}^{m}(t) \end{cases} ; \quad (20)$$

wherein $P_{home,l}(t)$, $t \in [1, T]$ represents a power consumption of a $l^{th}$ household in period t of the past $m^{th}$ day; $P_{home,l}^{max}(t)$ and $P_{home,l}^{min}(t)$ represent a maximum load power and minimum load power of the $l^{th}$ household in period t, respectively; and M represents a total sampling day of the historical load data.

In some embodiments, the $SOC_{SL}(t)$ of the second-life battery is calculated by the following formula:

$$\begin{cases} SOC_{SL}(t) = SOC_{SL}(t-1) + \eta_c P_{SL}(t)\Delta t/E_{SL,rate}, \\ \quad \text{for } P_{SL}(t) \geq 0, \forall\, t = 1, 2, \ldots, T \\ SOC_{SL}(t) = SOC_{SL}(t-1) - (|P_{SL}(t)|/\eta_d \Delta t)/E_{SL,rate}, \\ \quad \text{for } P_{SL}(t) < 0, \forall\, t = 1, 2, \ldots, T \end{cases} \quad (21)$$

wherein if $P_{SL}(t) > 0$, it indicates the second-life battery is charging, and otherwise, the second-life battery is discharging; and $\eta_c$ and $\eta_d$ represent a charging efficiency and discharging efficiency of the second-life battery, respectively.

In some embodiments, the super multi-objective energy management model further comprises a system transmission power constraint, expressed by:

$$-P_{grid,max-} \leq P_{grid}(t) \leq P_{grid,max+}, \forall\, t \in [1,T] \quad (22)$$

wherein $P_{grid,max+}$ and $P_{grid,max-}$ represent a maximum positive transmission capacity and a maximum negative transmission capacity of a transmission line between the smart community microgrid and the superior grid, respectively; and T represents a total dispatching period of the super multi-objective energy management model.

Compared with the prior art, this application has the following beneficial effects.

(1) In this application, a residual life decay model of a second-life battery is established based on a residual available capacity, a residual charge and discharge cycle number, and a capacity retention rate of the second-life battery, which can effectively reduce battery costs, extend the service life of the battery, and maximize the remaining value of second-life batteries. Moreover, it can also greatly reduce the cost of the household energy management involving energy storage batteries, and solve the practical problems of high prices of energy storage batteries and difficulties in wide applications.

(2) In this application, a super multi-objective energy management model is established, which considers the life loss of the second-life battery, the community energy cost, the peak-to-average ratio (PAR) in the community load curve, and residential energy habits, and gives feasible solutions for the above four objectives. In this way, the impacts of the community energy management model on users and the grid can be studied comprehensively from multiple aspects.

DETAILED DESCRIPTION OF EMBODIMENTS

The technical solutions of the present application will be clearly and completely described below with reference to the drawings and the embodiments.

Figure 1:
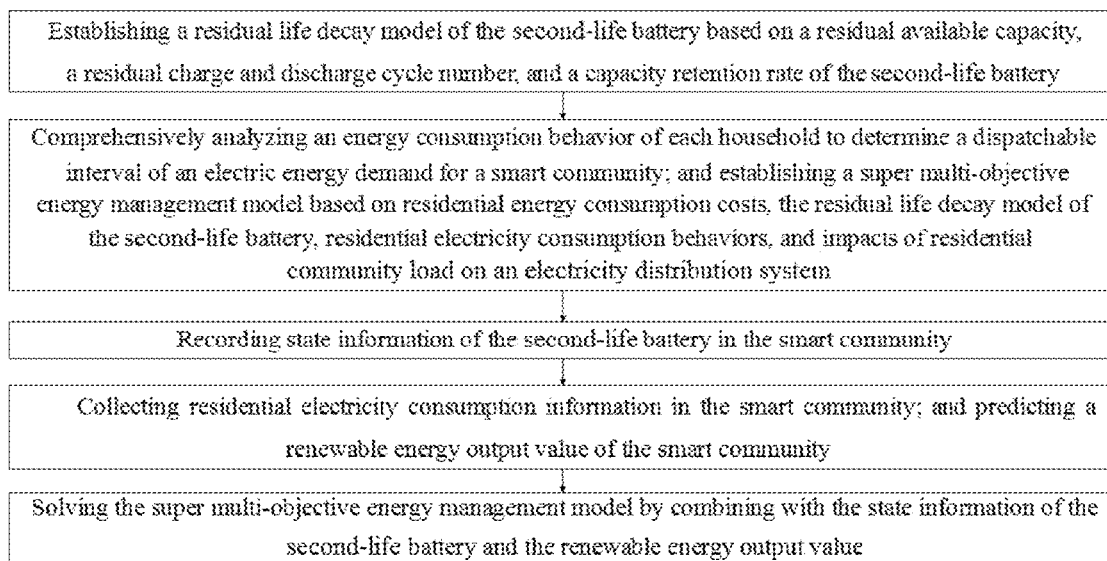
FIG. 1 is a flow chart of a second-life battery-based super multi-objective energy management method for a smart community microgrid according to an embodiment of the present disclosure.
Figure 2:
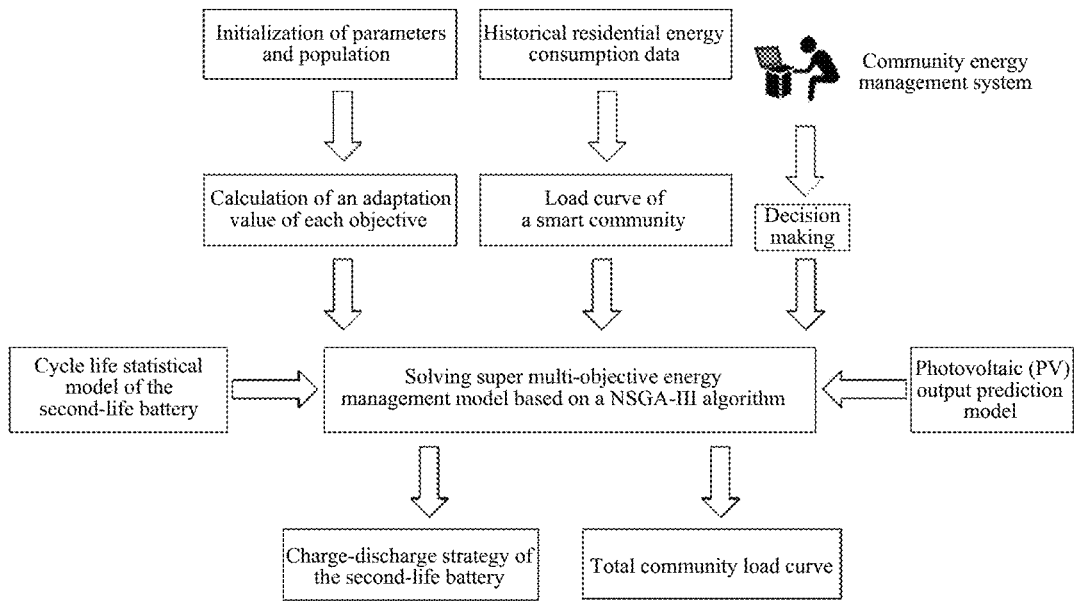
FIG. 2 schematically shows a super multi-objective energy management model solved by an non-dominated sorting genetic algorithm-III (NSGA-III) according to an embodiment of the present disclosure.

As shown in FIG. 1, a second-life battery-based super multi-objective energy management method for a smart community microgrid is provided, which is specifically described below.

(S1) A residual life decay model of the second-life battery is established based on a residual available capacity, a residual charge and discharge cycle number, and a capacity retention rate of the second-life battery.

An expected annual cycle number of a power battery of an electric vehicle is calculated by the following formulas:

$$n_{battery} = \frac{365 e E(D)}{100 Q_{battery}}; \text{ and} \quad (1)$$

$$E(D) = 1.61 \cdot \exp\left(\mu_D + \frac{\sigma_D^2}{2}\right); \quad (2)$$

where $n_{battery}$ represents an annual cycle number of the power battery; e represents a power consumption per 100 km of the electric vehicle; E(D) represents an expected value of daily driving range of the electric vehicle; $\mu_D$ and $\sigma_D$ respectively represent a mean value and variance of the expected value E(D) of daily driving range, $\mu_D = 3.2$, and $\sigma_D = 0.88$; and $Q_{battery}$ represents a rated capacity of the power battery.

When the power battery is decommissioned from the electric vehicle, a total cycle number $n_{retire}$ of the power battery is calculated by the following formula:

$$n_{retire} = N \cdot n_{battery} \quad (3);$$

where N represents an annual service life of the power battery when decommissioned;

A ratio of an actual capacity to a rated capacity is defined as a capacity retention rate. Since a residual available capacity of a second-life battery decreases with increases in charge and discharge cycle numbers during use, and the capacity retention rate of the second-life battery declines with the charge and discharge cycle numbers in accordance with a power function, the capacity retention rate of the second-life battery is calculated by the following formula:

$$Rc(n) = Q_0(C) - \chi \cdot n^\tau \quad (4);$$

where Rc(n) represents a capacity retention rate of the second-life battery after n cycles; and $Q_0(C)$, $\chi$, and $\tau$ represents an initial capacity retention rate, a capacity decay coefficient, and a power index, respectively;

In this embodiment, when the capacity retention rate of the second-life battery decays to a capacity retention rate threshold $Rc^{thr}$, the second-life battery is scraped; and calculating a maximum available cycle number $n_{scrap}$ of the second-life battery by the following formula:

$$n_{scrap} = \left(\frac{Q_0(C) - Rc^{thr}}{\chi}\right)^{\tau-1}. \quad (5)$$

A residual charge and discharge cycle number $n_{sec}$ of the second-life battery is calculated by subtracting the total cycle number $n_{retire}$ from the maximum available cycle number $n_{scrap}$ of the second-life battery, expressed by:

$$n_{sec} = n_{scrap} - n_{retire} \quad (6)$$

A cell capacity of the second-life battery is defined as $A_{rate}$ (mAh). When the capacity retention rate of the second-life battery decays to a threshold value $Rc^{thr}$, the second-life battery is scraped. An available interval capacity $A_{SL}$ of the second-life battery is calculated by the following formula:

$$A_{SL} = A_{rate} \cdot [Rc(n^{retire}) - Rc^{thr}] \quad (7).$$

An average decay capacity $A_{fade}$ of the second-life battery after one complete charge and discharge cycle is estimated based on the residual available capacity and the residual charge and discharge cycle number of the second-life battery by the following formula:

$$A_{fade} = A_{SL}/n_{sec} \quad (8).$$

(S2) An energy consumption behavior of each household is comprehensively analyzed to determine a dispatchable interval of an electric energy demand for a smart community. A super multi-objective energy management model is established based on residential energy consumption costs, the residual life decay model of the second-life battery, residential electricity consumption behaviors, and impacts of residential community load on an electricity distribution system.

The dispatchable interval of the electric energy demand is determined through the following steps.

A continuous 24-hour day is discretized into T periods, where for any a $t^{th}$ period, $t \in [1, 2, \ldots, T]$.

At the beginning of a dispatching cycle, a residential electricity load curve and renewable energy output information are predicted by an energy management center in the smart community through a smart measurement system.

A photovoltaic (PV) output of the smart community microgrid is expressed as:

$$P_{solar} = A \cdot S \cdot \xi \cdot [1 - 0.005(T_{out} - 25)] \quad (9);$$

where $P_{solar}$ represents a PV output; S represents an area of PV arrays installed in the smart community; $\xi$ represents photoelectric conversion efficiency; A represents a light intensity; and $T_{out}$ represents an outdoor temperature; and for users in the smart community, $\Theta$ represents a set of all households in the smart community; and a power consumption of a $l^{th}$ household in a period t of the past $m^{th}$ day is expressed by $P_{home,l}^m(t)$, $t \in [1, T]$, combined with historical load data to obtain a value range of residential electricity loads.

The super multi-objective energy management model includes a first objective function $f_1$, a second objective function $f_2$, a third objective function $f_3$, and a fourth objective function $f_4$.

The first objective function $f_1$ is configured to minimize a total community energy consumption cost, expressed by:

$$\begin{cases} \min f_1 = \sum_{t=1}^{T} \Phi(t) \Delta t \\ \Phi(t) = \begin{cases} P_{grid}(t) \cdot \theta(t) \Delta t, & \text{for } P_{grid}(t) \geq 0 \\ P_{grid}(t) \cdot \rho(t) \Delta t, & \text{for } P_{grid}(t) < 0 \end{cases} \end{cases} \quad (10)$$

where $\Phi(t)$ represents an energy consumption cost function in a period t; $\theta(t)$ and $\rho(t)$ represent an electricity-purchasing price of the smart community microgrid form a superior grid and an electricity-selling price of the smart community microgrid to the superior grid, respectively; $P_{grid}(t)$ represents a power of interaction between the smart community microgrid and the superior grid; and $P_{grid}(t) \leq 0$ represents that the smart community purchases electricity from the superior grid, and otherwise, the smart community sells electricity to the superior grid.

The second objective function $f_2$ is configured to minimize impacts on the residential electricity consumption behaviors, expressed by:

$$\min f_2 = \sum_{t=1}^{T} \sqrt{(P_{com}(t) - P_{com}^{re}(t))^2}; \text{ and} \quad (11)$$

$$P_{com}(t) = \sum_{l \in \Theta} P_{home,l}(t); \quad (12)$$

where $P_{com}(t)$ represents a total electricity load of the smart community in a period t before optimization of an energy management system, which is a sum of loads of all households in the smart community; $P_{com}^{re}(t)$ represents a total electricity load of the smart community in the period t after the optimization of the energy management system; $P_{home,l}(t)$ represents a load of a $l^{th}$ household of the smart community in the period t; and $\Theta$ represents the set of all households in the smart community.

The third objective function $f_3$ is configured to minimize a life loss of the second-life battery, represented by:

$$\begin{cases} \min f_3 = A_{fade} \cdot N_{100}^{eq,day} \\ N_{100}^{eq,day} = \sum_{k \in C} 0.5 \cdot (d_k^{half})^p \end{cases}; \quad (13)$$

where $A_{fade}$ represents an average decay capacity of the second-life battery experienced one complete charge and discharged cycle; $N_{100}^{eq,day}$ represents a daily charge and discharge cycle number of the second-life battery after equivalent conversion; p is a constant, and is 0.8-2.1; C represents a charge and discharge half-cycle number; $d_k^{half}$ represents a depth of discharge (DoD) of the second-life battery in a $k^{th}$ half-cycle, which is obtained through an energy curve of the second-life battery, shown in formula (14):

$$d_k^{half} = \frac{|E_k - E_{k-1}|}{E_{SL,rate}}, \forall k \in C; \quad (14)$$

where k represents a half-cycle number index of the second-life battery index, and is a modulus value of the charge and discharge half-cycle number C; $E_{SL,rate}$ represents a rated capacity of the second-life battery; and $E_k$ represents an energy level of the second-life battery at the end of a $k^{th}$ half-cycle, which corresponds to a local extreme point on the energy curve.

The fourth objective function $f_4$ is configured to minimize a peak-to-average ratio of a community load curve, which consists of a sum of a positive peak-to-average ratio (PPAR) and a negative peak-to-average ratio (NPAR). The PPAR represents a load peak-to-average (PAR) when the smart community purchases electricity from the superior grid, and the NPAR represents a load PAR when the smart community sells electricity to the superior grid, expressed as:

$$\begin{cases} \min f_4 = NPAR + PPAR \\ PPAR = \dfrac{T_p \cdot \max\limits_{t \in [1,T_P]} \{P_{grid}(t)\}}{\sum\limits_{t \in [1,T_P]} P_{grid}(t)}, \text{ for } P_{grid}(t) > 0 \\ NPAR = \dfrac{T_N \cdot \min\limits_{t \in [1,T_N]} \{P_{grid}(t)\}}{\sum\limits_{t \in [1,T_N]} P_{grid}(t)}, \text{ for } P_{grid}(t) < 0 \end{cases} \quad (15)$$

where $T_N$, and $T_P$ represent an electricity-purchasing duration and an electricity-selling duration in a dispatch cycle respectively.

The super multi-objective energy management model further includes a system power balance constraint, a community load curve constraint, an energy storage system operation constraint, and a system transmission power constraint.

The system power balance constraint is expressed as:

$$P_{grid}(t) = P_{com}^{re}(t) + P_{SL}(t) - P_{solar}(t) \quad (16)$$

where $P_{solar}(t)$ represents a PV output in a period t; $P_{SL}(t)$ represents a charging and discharging power of the second-life battery in the period t; if $P_{SL}>0$, it indicates the second-life battery is charging, and otherwise, the second-life battery is discharging; and $P_{com}^{re}(t)$ represents a total electricity load of the smart community in the period t after optimization by the energy management system.

The community load curve constraint is expressed as:

$$\begin{cases} P_{com}^{min}(t) \leq P_{com}^{re}(t) \leq P_{com}^{max}(t), \forall t = 1, 2, \ldots, T \\ \sum\limits_{t=1}^{T} P_{com}^{re}(t) - \sum\limits_{t=1}^{T} P_{com}(t) = 0 \end{cases} \quad (17)$$

where $P_{com}^{min}(t)$ represents a minimum energy consumption power of the smart community microgrid in a period t; $P_{com}^{max}(t)$ represents a maximum energy consumption power of the smart community microgrid in the period t; $P_{com}^{re}(t)$ represents a total electricity load of the smart community microgrid after optimization by the energy management system in the period t; and $P_{com}(t)$ represents a total community electricity load.

The energy storage system operation constraint is expressed as:

$$\begin{cases} SOC_{SL,min} \leq SOC_{SL}(t) \leq SOC_{SL,max}, \forall t \in [1, T] \\ SOC_{SL}(t) = E_{SL}(t)/E_{SL,rate}, \forall t \in [1, T] \\ -P_{SL,max-} \leq P_{SL}(t) \leq P_{SL,max+}, \forall t \in [1, T] \\ SOC_{SL}(t) \geq SOC_{desire}, t = T \end{cases} \quad (18)$$

where $SOC_{SL}(t)$ represents a state of charge (SOC) of the second-life battery in a period t; $SOC_{SL}(t)$ and $SOC_{SL,max}$ represent a minimum SOC and maximum SOC of the second-life battery, respectively; $P_{SL,max-}$ and $P_{SL,max+}$ represent a maximum charge power and maximum discharge power of the second-life battery, respectively; $SOC_{desire}$ represents a preset SOC threshold of the second-life battery; $E_{SL}(t)$ represents a residual electric quantity of the second-life battery in period t; and $E_{SL,rate}$ represents a rated capacity of the second-life battery.

The $SOC_{SL}(t)$ of the second-life battery is calculated by the following formula:

$$\begin{cases} SOC_{SL}(t) = SOC_{SL}(t-1) + \eta_c P_{SL}(t)\Delta t/E_{SL,rate}, \\ \text{for } P_{SL}(t) \geq 0, \forall t = 1, 2, \ldots, T \\ SOC_{SL}(t) = SOC_{SL}(t-1) - (|P_{SL}(t)|/\eta_d \Delta t)/E_{SL,rate}, \\ \text{for } P_{SL}(t) < 0, \forall t = 1, 2, \ldots, T \end{cases} \quad (21)$$

where if $P_{SL}(t)>0$, it indicates the second-life battery is charging, and otherwise, the second-life battery is discharging; and $\eta_c$ and $\eta_d$ represent a charging efficiency and discharging efficiency of the second-life battery, respectively.

The system transmission power constraint is expressed by:

$$-P_{grid,max-} \leq P_{grid}(t) \leq P_{grid,max+}, \forall t \in [1,T] \quad (22);$$

where $P_{grid,max+}$ and $P_{grid,max-}$ represent a maximum positive transmission capacity and a maximum negative transmission capacity of a transmission line between the smart community microgrid and the superior grid, respectively; and T represents a total dispatching period of the super multi-objective energy management model.

(S3) State information of the second-life battery is recorded in the smart community.

(S4) Residential electricity consumption information in the smart community is collected. A renewable energy output value of the smart community is predicted.

(S5) The super multi-objective energy management model is solved by using an non-dominated sorting genetic algorithm-III (NSGA-III) combining with the state information of the second-life battery and the renewable energy output value at a current period to obtain charge and discharge quantities of the second-life battery at each period within a day. A total energy consumption curve of the smart community is plotted by adjusting the charge and discharge quantities of the second-life battery.

In this embodiment, the predicted values of uncertain variables include a PV output $P_{solar}(t)$ and a total electricity load $P_{com}(t)$ of the smart community, and the solver uses the intelligent algorithm NSGA-III for solving. The specific solution steps are known to those skilled in the art, and the embodiments of the present disclosure will not be repeated in this regard.

To enable those skilled in the art to better understand the present disclosure, a small smart community is taken as an example herein for numerical simulation.

Figure 3:
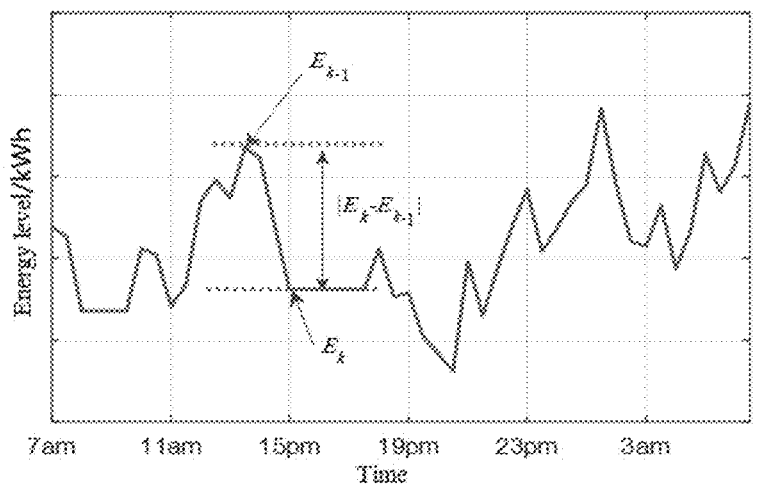
FIG. 3 is an energy curve graph of the second-life battery over time according to an embodiment of the present disclosure.

In this embodiment, the smart community consists of 50 households, and the load data of each household for the past 90 days is selected to obtain the maximum and minimum power consumption of each household. Based on this, the total load curve and the load curve interval of the smart community can be obtained, as shown in FIG. 3.

Figure 4:
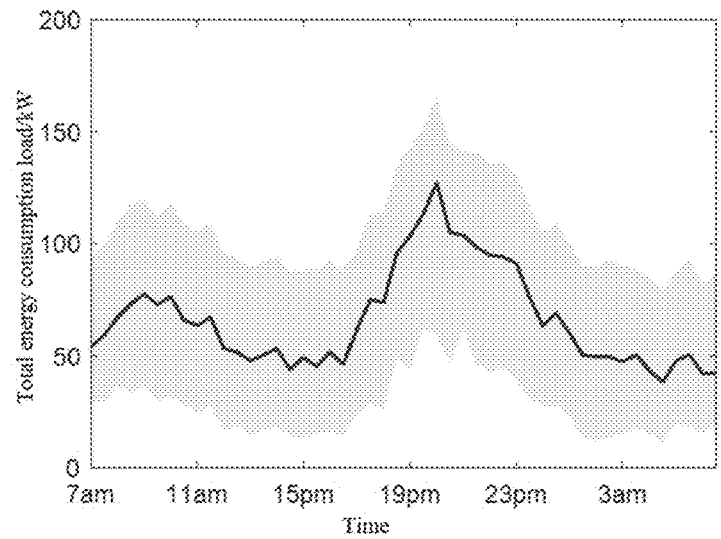
FIG. 4 is a total energy consumption curve graph of a smart community according to an embodiment of the present disclosure.

Assuming that the community residents share the distributed PV power generation unit, and the smart community is equipped with a PV array having an area of 640 square meters with a photoelectric conversion efficiency of 16.4%. The light intensity curve and temperature data for a typical day are shown in FIG. 4. Assuming that the working temperature of the second-life battery is maintained at a constant temperature of 27° C., the specific parameters of the second-life battery is shown in Table 1, and the time-of-use tariff data of the superior grid is shown in Table 2. The power limit of transmission between the smart community microgrid with the superior grid is 400 kw. In this dispatching model, the total dispatching period T is set as 24 h, the time interval is 30 min, and the total dispatching periods are 48. It is assumed that residential customers start their normal day at 7:00 a.m., so the starting time of the dispatching cycle is set as 7:00 a.m.

TABLE 1

Operation parameters of the second-life battery

| Parameters | values |
|---|---|
| $E_{SL,rate}$(kWh) | 400 |
| $P_{SL,max+}$(kW) | 100 |
| $P_{SL,max-}$(kW) | 100 |
| $A_{rate}$(mAh) | 1.07e6 |
| $SOC_{SL,min}$ | 0.10 |
| $SOC_{SL,max}$ | 0.90 |
| $SOC_{desier}$ | 0.30 |
| e(kWh/100 km) | 15 |
| $Q_0$(C) | 1.0 |
| $Q_{battery}$(kWh) | 24 |
| $\eta_c$ | 0.95 |
| $\eta_d$ | 0.85 |
| $Rc^{thr}$ | 0.60 |
| X | 0.1549 |
| $\tau$ | 0.7151 |
| N | 10 |

TABLE 2

Time-of-use tariff data of the superior grid

| | Valley period | Shoulder period | Peak period |
|---|---|---|---|
| Electricity price | 22 pm-7 am | 7 am-14 pm 20-22 pm | 14-20 pm |
| Electricity-selling price $\rho(t)$ | 0.0814 | 0.1408 | 0.3564 |
| Electricity-purchasing price $\theta(f)$ | 0.0814 | 0.1516 | 0.4002 |

To verify the effectiveness of the super multi-objective energy management method in this embodiment, four different scenarios are simulated and analyzed as follows.

Case 1: without considering second-life batteries and distributed PV, and without energy management for the community, the community energy cost is calculated based on the time-of-use tariff and the total electricity load.

Case 2: without considering second-life batteries and distributed PV, multi-objective energy management is performed for the community (optimization objective 1: minimize energy cost; optimization objective 2: minimize interference with customer behavior; optimization objective 3: minimize the peak-to-average ratio (PAR) of the community load curve).

Case 3: a super multi-objective energy management method for a smart community involving second-life batteries and distributed PV.

Case 4: a super multi-objective energy management method for a smart community involving with second-life batteries and distributed PV, and compared with Case 3, the objective function in case 4 does not include the capacity decay cost $f_3$ of the second-life battery.

The total energy consumption cost, the impact of the residential electricity consumption behaviors, the life decay cost of the second-life battery, and PAR under the four scenarios are shown in Table 3.

TABLE 3

Comparison of optimized objective values under different scenarios

| | Objectives for optimization | | | | |
|---|---|---|---|---|---|
| | | f2 | f3 | f4 | |
| | f1 | Impact of the electricity | Capacity decay | Peak-to-average ratio (PAR) of a community load curve | |
| Case# | Energy consumption cost ($) | residential consumption behaviors (kW) | value of the second-life battery (mAh) | Positive peak-to-average ratio (PPAR) (a.u.) | Negative peak-to-average ratio (NPAR) (a.u.) |
| 1 | 281.02 | 0 | \ | 1.91 | \ |
| 2 | 235.01 | 814.60 | \ | 1.46 | \ |
| 3 | 118.23 | 261.17 | 90.26 | 1.77 | 1.32 |
| 4 | 107.30 | 140.07 | 140.94 | 1.60 | 1.09 |

Figure 5:
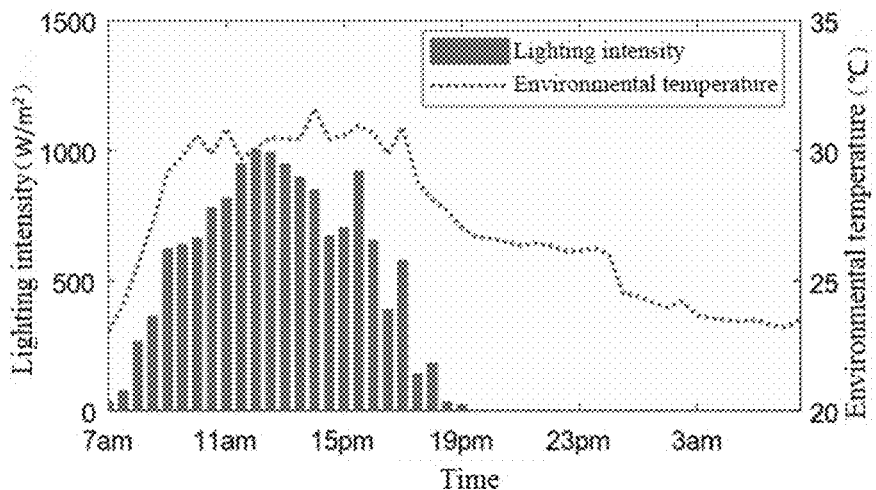
FIG. 5 schematically shows a diagram of light intensity and ambient temperature on a typical day according to an embodiment of the present disclosure.

Case 1 is selected as the baseline scenario for analysis and comparison. As can be seen from Table 3, although in Case 2, a multi-objective energy management is performed for the community, and the total energy consumption cost and PPAR are reduced to a certain extent by optimizing the total load curve of the smart community. whereas, it largely affects the electricity consumption behavior of customers. Specifically, the impact of electricity consumption behavior of the entire community reaches 814.60 kW, with an average impact of about 16.292 kW per household. Compared with Case 1, in Case 3, both the total energy consumption cost and the PPAR are reduced to some extents, with the energy consumption cost ($118.23) reduced by about 57.93% and the PPAR (1.77 a.u.) reduced by about 23.56%. Compared with Case 2, although the PPAR in Case 3 is slightly larger (exceeding Case 2 by 21.23%), both the community energy consumption cost $f_1$ and the impact of electricity consumption behavior $f_2$ are significantly reduced, by 49.69% and 67.94%, respectively. In summary, compared with Case 1 and Case 2, Case 3 gives a comprehensive consideration including the impact of residential electricity consumption behavior, the energy consumption cost, and the load PAR. To illustrate the impact of second-life batteries on the household energy management model, Case 3 and Case 4 are further compared and analyzed. It can be found that excluding the capacity decay cost of the second-life battery from the objective function can reduce the community energy consumption cost to a certain extent, mitigate the impact on residential electricity consumption behaviors, and reduce the PAR of load curve. However, frequent use of second-life batteries will cause the significant decay in capacity of the second-life battery. The life loss cost of second-life batteries in Case 4 is increased by about 56.15% compared to Case 3. To further illustrate the impact of different objective models on the operation mode of the second-life battery, the state of charge (SOC) curve of the second-life battery under two scenarios in one dispatch cycle is provided in FIG. 5. Compared with Case 3, the second-life battery in Case 4 experience more charging and discharging cycles and deeper charging and discharging depths, and the life loss cost of the second-life battery under the same typical day is thus greater.

Figure 6:
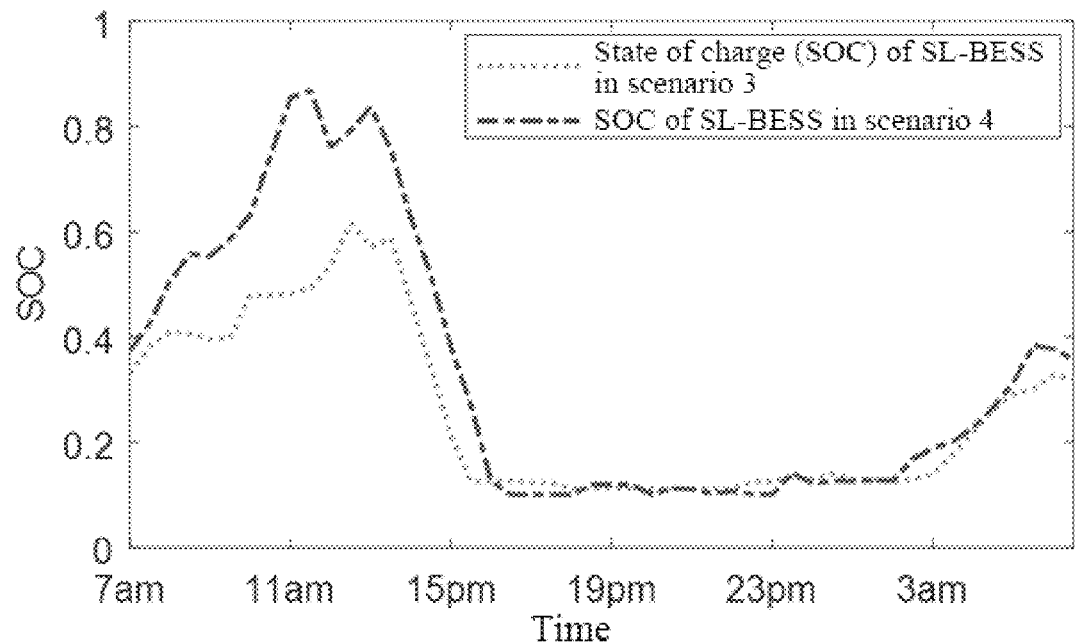
FIG. 6 schematically shows a state of charge (SOC) of the second-life battery under scenarios 3 and 4 on a typical day according to an embodiment of the present disclosure.
Figure 7:
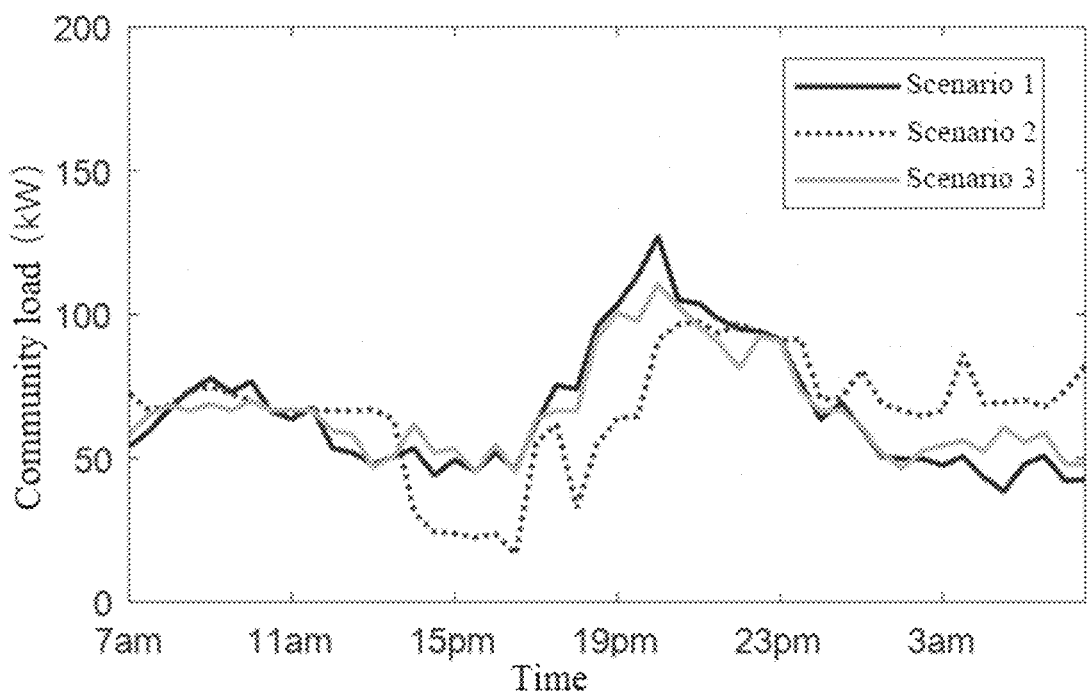
FIG. 7 schematically shows a community load graph under scenarios 1-3 on a typical day according to an embodiment of the present disclosure.

To further illustrate the effectiveness of the super multi-objective energy management method provided herein, the community load curves for Cases 1-3 on a typical day are presented in FIG. 6. Compared with Case 1, Case 2 reduces the amount of electricity purchased from the superior grid during the peak tariff period (14:00-20:00 pm) and increases the amount of purchased electricity during the valley tariff period (22:00 pm-7:00 am), which reduces the total energy consumption cost of the community. Furthermore, on the basis of Case 2, Case 3 not only increases the total amount of the purchased electricity during the valley tariff period, but also reduces the amount of the purchased electricity during the flat tariff period (7 am-14 pm, 20 pm-22 pm) to a certain extent by using photovoltaic power generation. On the other hand, during peak tariff period (17:00 pm-20:00 pm), Case 3 has a larger amount of electricity purchased from outside than Case 2, which aims to reduce the impact of the energy management model on the residential electricity consumption behaviors. Therefore, the total energy consumption cost in Case 3 is the smallest. By comparing with Case 1, it can be found that the total community load curve of Case 3 is closer to that of Case 1, while the total community load curve of Case 2 is more different from that of Case 1, implying that Case 3 has less impacts on residential electricity consumption behaviors.

To further illustrate the impacts of the super multi-objective energy management model on the electricity consumption cost of individual households, Table 4 shows the electricity consumption cost of 50 households in the smart community under two different scenarios, namely, Case 1 and Case 3. It can be clearly seen that under Case 3, the electricity consumption cost of each household can be significantly reduced. Compared with Case 1, some households have negative electricity consumption cost under Case 3, indicating that the electricity sales distributed to those household exceeds their own electricity consumption costs, which is due to the fact that the household sells PV power to the superior grid during peak tariff period to obtain a larger revenue from electricity sales.

TABLE 4

Comparison of energy consumption costs for each household under Scenario 1 and Scenario 3

| Households | Case 1 cost ($) | Case 3 cost ($) |
| --- | --- | --- |
| 1 | 8.018 | 6.096 |
| 2 | 4.144 | 0.730 |
| 3 | 6.351 | 2.435 |
| 4 | 4.934 | 1.827 |
| 5 | 10.107 | 7.578 |
| 6 | 5.874 | 1.642 |
| 7 | 6.096 | 2.625 |
| 8 | 3.665 | 0.568 |
| 9 | 5.012 | 1.835 |
| 10 | 2.490 | -0.232 |
| 11 | 5.874 | 1.704 |
| 12 | 4.003 | 1.181 |
| 13 | 6.096 | 2.424 |
| 14 | 5.012 | 1.851 |
| 15 | 2.490 | -0.251 |
| 16 | 1.472 | -1.495 |
| 17 | 4.076 | 0.674 |
| 18 | 5.874 | 1.785 |
| 19 | 6.096 | 2.597 |
| 20 | 3.665 | 0.569 |
| 21 | 5.012 | 1.841 |
| 22 | 4.003 | 1.106 |
| 23 | 6.096 | 2.613 |
| 24 | 3.665 | 0.524 |
| 25 | 6.840 | 3.924 |
| 26 | 4.375 | 1.193 |
| 27 | 3.141 | 0.135 |
| 28 | 3.052 | 0.260 |
| 29 | 6.840 | 3.869 |
| 30 | 3.141 | 0.136 |
| 31 | 4.934 | 1.869 |
| 32 | 6.096 | 2.620 |
| 33 | 5.012 | 1.835 |
| 34 | 4.076 | 0.657 |
| 35 | 6.773 | 3.759 |
| 36 | 6.096 | 2.639 |
| 37 | 5.012 | 1.752 |
| 38 | 4.076 | 0.656 |
| 39 | 6.672 | 2.420 |
| 40 | 7.010 | 3.739 |
| 41 | 8.121 | 5.344 |
| 42 | 11.243 | 8.387 |
| 43 | 12.654 | 9.068 |
| 44 | 8.514 | 4.387 |
| 45 | 6.450 | 3.253 |
| 46 | 5.557 | 2.076 |
| 47 | 6.909 | 3.630 |
| 48 | 4.334 | 1.625 |
| 49 | 5.728 | 1.870 |
| 50 | 8.236 | 4.905 |

In summary, the super multi-objective energy management method provided herein can provide more economical, clean, efficient and comfortable energy services for smart communities by combining second-life batteries with distributed energy generation technology. At the same time, by appropriately designing the super multi-objective energy management strategy, different operation objectives in the smart community can be well balanced, which can reduce residential energy consumption costs as much as possible without disturbing residential power consumption behaviors, smooth residential load curve, and extend the service life of second-life batteries. The super multi-objective energy management method provided herein is highly efficient, green, and energy-saving.

The above-mentioned embodiments are merely preferred embodiments of the present disclosure, and are not intended to limit the present disclosure. Although the present disclosure has been described in detail with reference to the aforementioned embodiments, it should be understood by one of ordinary skill in the art that all modifications and equivalent replacements made by those skilled in the art without departing from the spirit and scope of the disclosure shall fall within the scope of the disclosure defined by the appended claims.

What is claimed is:

1. A second-life battery-based super multi-objective energy management method for a smart community microgrid, comprising:
(S0) recycling and deploying a second-life battery in the smart community microgrid; deploying photovoltaic (PV) arrays in the smart community microgrid; and installing a smart energy management controller and a smart electric meter for each household of a smart community;
(S1) establishing a residual life decay model of a second-life battery based on a residual available capacity, a residual charge and discharge cycle number, and a capacity retention rate of the second-life battery;
(S2) comprehensively analyzing an energy consumption behavior of each household to determine a dispatchable interval of an electric energy demand for the smart community; and establishing a super multi-objective energy management model based on residential energy consumption costs, the residual life decay model of the second-life battery, residential electricity consumption behaviors, and impacts of residential community load on an electricity distribution system;
(S3) recording state information of the second-life battery in the smart community;
(S4) collecting residential electricity consumption information in the smart community; and predicting a renewable energy output value of the smart community; and
(S5) solving the super multi-objective energy management model by using an non-dominated sorting genetic algorithm-III (NSGA-III) combining with the state information of the second-life battery and the renewable energy output value at a current period to obtain charge and discharge quantities of the second-life battery at each period within a day; and plotting a total energy consumption curve of the smart community by adjusting the charge and discharge quantities of the second-life battery.

2. The second-life battery-based super multi-objective energy management method of claim 1, wherein step (S1) is performed through steps of:
calculating an expected annual cycle number of a power battery of an electric vehicle by the following formulas:

$$n_{battery} = \frac{365eE(D)}{100Q_{battery}}; \text{ and} \quad (1)$$

$$E(D) = 1.61 \cdot \exp\left(\mu_D + \frac{\sigma_D^2}{2}\right); \quad (2)$$

wherein $n_{battery}$ represents an annual cycle number of the power battery; e represents a power consumption per 100 km of the electric vehicle; E(D) represents an expected value of daily driving range of the electric vehicle; $\mu_D$ and $\sigma_D$ respectively represent a mean value and variance of the expected value E(D) of daily driving range, $\mu_D$=3.2, and $\sigma_D$=0.88; and $Q_{battery}$ represents a rated capacity of the power battery;

when the power battery is decommissioned from the electric vehicle, calculating a total cycle number $n_{retire}$ of the power battery by the following formula:

$$n_{retire} = N \cdot n_{battery} \quad (3);$$

wherein N represents an annual service life of the power battery when decommissioned;
defining a ratio of an actual capacity to a rated capacity as a capacity retention rate; since a residual available capacity of a second-life battery decreases with increases in charge and discharge cycle numbers during use, and the capacity retention rate of the second-life battery declines with the charge and discharge cycle numbers in accordance with a power function, calculating the capacity retention rate of the second-life battery by the following formula:

$$Rc(n) = Q_0(C) - x \cdot n^\tau \quad (4);$$

wherein Rc(n) represents a capacity retention rate of the second-life battery after n cycles; and $Q_0(C)$, X, and $\tau$ represents an initial capacity retention rate, a capacity decay coefficient, and a power index, respectively;
defining that when the capacity retention rate of the second-life battery decays to a capacity retention rate threshold $Rc^{thr}$, the second-life battery is scraped; and calculating a maximum available cycle number $n_{scrap}$ of the second-life battery by the following formula:

$$n_{scrap} = \left(\frac{Q_0(C) - Rc^{thr}}{X}\right)^{\tau^{-1}}; \quad (5)$$

calculating a residual charge and discharge cycle number $n_{sec}$ of the second-life battery by subtracting the total cycle number $n_{retire}$ from the maximum available cycle number $n_{scrap}$ of the second-life battery, expressed by:

$$n_{sec} = n_{scrap} - n_{retire} \quad (6);$$

defining a cell capacity of the second-life battery as $A_{rate}$(mAh); and calculating an available interval capacity $A_{SL}$ of the second-life battery by the following formula:

$$A_{SL} = A_{rate} \cdot [Rc(n^{retire}) - Rc^{thr}] \quad (7); \text{ and}$$

estimating an average decay capacity $A_{fade}$ of the second-life battery after one complete charge and discharge cycle based on the residual available capacity and the residual charge and discharge cycle number of the second-life battery by the following formula:

$$A_{fade} = A_{SL}/n_{sec} \quad (8).$$

3. The second-life battery-based super multi-objective energy management method of claim 2, wherein in step (S2), the dispatchable interval of the electric energy demand is determined through steps of:
discretizing a continuous 24-hour day into T periods; wherein for any a $l^{th}$ period, t∈[1, 2, ..., T]; and
at the beginning of a dispatching cycle, predicting a residential electricity load curve and renewable energy output information by an energy management center in the smart community through a smart measurement system;
wherein a photovoltaic (PV) output of the smart community microgrid is expressed as:

$$P_{solar} = A \cdot S \cdot \xi \cdot [1 - 0.005(T_{out} - 25)] \quad (9);$$

wherein $P_{solar}$ represents a PV output; S represents an area of the PV arrays installed in the smart community; ξ represents photoelectric conversion efficiency; A represents a light intensity; and $T_{out}$ represents an outdoor temperature; and for users in the smart community, Θ represents a set of all households in the smart community; and a power consumption of a $l^{th}$ household in a period t of the past $m^{th}$ day is expressed by $P_{home,l}^{m}/(t)$, t∈[1, T], combined with historical load data to obtain a value range of residential electricity loads.

4. The second-life battery-based super multi-objective energy management method of claim 3, wherein in step (S2), the super multi-objective energy management model comprises a first objective function $f_1$, a second objective function $f_2$, a third objective function $f_3$, and a fourth objective function $f_4$;

wherein the first objective function $f_1$ is configured to minimize a total community energy consumption cost, expressed by:

$$\begin{cases} \min f_1 = \sum_{t=1}^{T} \Phi(t) \Delta t \\ \Phi(t) = \begin{cases} P_{grid}(t) \cdot \theta(t) \Delta t, & \text{for } P_{grid}(t) \geq 0 \\ P_{grid}(t) \cdot \rho(t) \Delta t, & \text{for } P_{grid}(t) < 0 \end{cases} \end{cases} \quad (10)$$

wherein Φ(t) represents an energy consumption cost function in a period t; θ(t) and ρ(t) represent an electricity-purchasing price of the smart community microgrid form a superior grid and an electricity-selling price of the smart community microgrid to the superior grid, respectively; and $P_{grid}(t)$ represents a power of interaction between the smart community microgrid and the superior grid; $P_{grid}(t) \geq 0$ represents that the smart community purchases electricity from the superior grid, and otherwise, the smart community sells electricity to the superior grid;

the second objective function $f_2$ is configured to minimize impacts on the residential electricity consumption behaviors, expressed by:

$$\min f_2 = \sum_{t=1}^{T} \sqrt{(P_{com}(t) - P_{com}^{re}(t))^2} \text{; and} \quad (11)$$

$$P_{com}(t) = \sum_{l \in \Theta} P_{home,l}(t); \quad (12)$$

wherein $P_{com}(t)$ represents a total electricity load of the smart community in a period t before optimization of an energy management system, which is a sum of loads of all households in the smart community; $P_{com}^{re}(t)$ represents a total electricity load of the smart community in the period t after the optimization of the energy management system; $P_{home,l}(t)$ represents a load of a $l^{th}$ household of the smart community in the period t; and Θ represents the set of all households in the smart community;

the third objective function $f_3$ is configured to minimize a life loss of the second-life battery, represented by:

$$\begin{cases} \min f_3 = A_{fade} \cdot N_{100}^{eq,day} \\ N_{100}^{eq,day} = \sum_{k \in C} 0.5 \cdot (d_k^{half})^p \end{cases} ; \quad (13)$$

wherein $A_{fade}$ represents an average decay capacity of the second-life battery experienced one complete charge and discharged cycle; $N_{100}^{eq,day}$ represents a daily charge and discharge cycle number of the second-life battery after equivalent conversion; p is a constant, and is 0.8-2.1; C represents a charge and discharge half-cycle number; $d_k^{half}$ represents a depth of discharge (DoD) of the second-life battery in a $k^{th}$ half-cycle, which is obtained through a capacity fading curve of the second-life battery, shown in formula (14):

$$d_k^{half} = \frac{|E_k - E_{k-1}|}{E_{SL,rate}}, \forall k \in C; \quad (14)$$

wherein k represents a half-cycle number index of the second-life battery index, and is a modulus value of the charge and discharge half-cycle number C; $E_{SL,rate}$ represents a rated capacity of the second-life battery; and $E_k$ represents an energy level of the second-life battery at the end of a $k^{th}$ half-cycle, which corresponds to a local extreme point on the energy curve; and the fourth objective function $f_4$ is configured to minimize a peak-to-average ratio of a community load curve;

wherein the objective function $f_4$ consists of a sum of a positive peak-to-average ratio (PPAR) and a negative peak-to-average ratio (NPAR); the PPAR represents a load peak-to-average (PAR) when the smart community purchases electricity from the superior grid, and the NPAR represents a load PAR when the smart community sells electricity to the superior grid, expressed as:

$$\begin{cases} \min f_4 = NPAR + PPAR \\ PPAR = \dfrac{T_p \cdot \max\limits_{t \in [1, T_p]} \{P_{grid}(t)\}}{\sum\limits_{t \in [1, T_p]} P_{grid}(t)}, \text{ for } P_{grid}(t) > 0 \\ NPAR = \dfrac{T_N \cdot \min\limits_{t \in [1, T_N]} \{P_{grid}(t)\}}{\sum\limits_{t \in [1, T_N]} P_{grid}(t)}, \text{ for } P_{grid}(t) < 0 \end{cases} \quad (15)$$

wherein $T_N$, and $T_P$ represent an electricity-purchasing duration and an electricity-selling duration in a dispatch cycle respectively.

5. The second-life battery-based super multi-objective energy management method of claim 4, wherein in step (S2), the super multi-objective energy management model further comprises a system power balance constraint, a community load curve constraint, and an energy storage system operation constraint;

wherein the system power balance constraint is expressed as:

$$P_{grid}(t) = P_{com}^{re}(t) + P_{SL}(t) - P_{solar}(t) \quad (16);$$

wherein $P_{solar}(t)$ represents a PV output in a period t; $P_{SL}(t)$ represents a charging and discharging power of the second-life battery in the period t; if $P_{SL}(t) > 0$, it indicates the second-life battery is charging, and otherwise, the second-life battery is discharging; and $P_{com}^{re}(t)$ represents a total electricity load of the smart community in the period t after optimization by the energy management system;

the community load curve constraint is expressed as:

$$\begin{cases} P_{com}^{min}(t) \le P_{com}^{re}(t) \le P_{com}^{max}(t), \forall\, t = 1, 2, \ldots, T \\ \sum_{t=1}^{T} P_{com}^{re}(t) - \sum_{t=1}^{T} P_{com}(t) = 0 \end{cases} \quad (17)$$

wherein $p_{com}^{min}(t)$ represents a minimum energy consumption power of the smart community microgrid in a period t; $p_{com}^{max}(t)$ represents a maximum energy consumption power of the smart community microgrid in the period t; $P_{com}^{re}(t)$ represents a total electricity load of the smart community microgrid after optimization by the energy management system in the period t; and $P_{com}(t)$ represents a total community electricity load; and the energy storage system operation constraint is expressed as:

$$\begin{cases} SOC_{SL,min} \le SOC_{SL}(t) \le SOC_{SL,max}, \forall\, t \in [1, T] \\ SOC_{SL}(t) = E_{SL}(t)/E_{SL,rate}, \forall\, t \in [1, T] \\ -P_{SL,max-} \le P_{SL}(t) \le P_{SL,max+}, \forall\, t \in [1, T] \\ SOC_{SL}(t) \ge SOC_{desire},\, t = T \end{cases} \quad (18)$$

wherein $SOC_{SL}(t)$ represents a state of charge (SOC) of the second-life battery in a period t; $SOC_{SL}(t)$ and $SOC_{SL}$,max represent a minimum SOC and maximum SOC of the second-life battery, respectively; $P_{SL,max-}$ and $P_{SL, max+}$ represent a maximum charge power and maximum discharge power of the second-life battery, respectively; $SOC_{desire}$ represents a preset SOC threshold of the second-life battery; $E_{SL}(t)$ represents a residual electric quantity of the second-life battery in period t; and $E_{SL, rate}$ represents a rated capacity of the second-life battery.

6. The second-life battery-based super multi-objective energy management method of claim 5, wherein the total community electricity load $P_{com}$ (t) is calculated through steps of:
  estimating a minimum electricity load and maximum electricity load of each household of the smart community in the period t by using the historical electricity load data; and
  summing up electrical loads of all households of the smart community to obtain a range of the total community electricity load by the following formulas:

$$\begin{cases} P_{com}^{min}(t) = \sum_{l \in \Theta} P_{home,l}^{min}(t), \forall\, t \in [1, T] \\ P_{home,l}^{min}(t) = \min_{m \in [1,M]} P_{home,l}^{m}(t) \end{cases} ; \text{ and} \quad (17)$$

$$\begin{cases} P_{com}^{max}(t) = \sum_{l \in \Theta} P_{home,l}^{max}(t), \forall\, t \in [1, T] \\ P_{home,l}^{max}(t) = \max_{m \in [1,M]} P_{home,l}^{m}(t) \end{cases} ; \quad (20)$$

wherein $P_{home,l}^{m}(t), t \in [1,T']$ represents a power consumption of a $l^{th}$ household in period t of the past $m^{th}$ day; $P_{home,l}^{max}(t)$ and $P_{home,l}^{min}(t)$ represent a maximum load power and minimum load power of the $l^{th}$ household in period t, respectively; and M represents a total sampling day of the historical load data.

7. The second-life battery-based super multi-objective energy management method of claim 6, wherein the $SOC_{SL}$ (t) of the second-life battery is calculated by the following formula:

$$\begin{cases} SOC_{SL}(t) = SOC_{SL}(t-1) + \eta_c P_{SL}(t)\Delta t/E_{SL,rate}, \\ \text{for } P_{SL}(t) \ge 0, \forall\, t = 1, 2, \ldots, T \\ SOC_{SL}(t) = SOC_{SL}(t-1) - (|P_{SL}(t)|/\eta_d \Delta t)/E_{SL,rate}, \\ \text{for } P_{SL}(t) < 0, \forall\, t = 1, 2, \ldots, T \end{cases} \quad (21)$$

wherein if $P_{SL}(t) > 0$, it indicates the second-life battery is charging, and otherwise, the second-life battery is discharging; and $\eta_c$ and $\eta_d$ represent a charging efficiency and discharging efficiency of the second-life battery, respectively.

8. The second-life battery-based super multi-objective energy management method of claim 6, wherein the super multi-objective energy management model further comprises a system transmission power constraint, expressed by:

$$-P_{grid,max-} \le P_{grid}(t) \le P_{grid,max+}, \forall\, t \in [1, T] \quad (22)$$

wherein $P_{grid,max-}$ represent a maximum positive transmission $P_{grid,max+}$ and capacity and a maximum negative transmission capacity of a transmission line between the smart community microgrid and the superior grid, respectively; and $\tau$ represents a total dispatching period of the super multi-objective energy management model.

\* \* \* \* \*